United States Patent [19]

Suladze et al.

[11] 4,378,522

[45] Mar. 29, 1983

[54] ADJUSTABLE CURRENT SOURCE

[76] Inventors: Robert N. Suladze, ulitsa Barnova, 112, kv. 7, Tbilisi; Kirill D. Gutterman, ulitsa Tretya Tverskaya-Yamskaya, 29/6, kv. 8, Moscow; Medgar N. Gelenidze, Rustavskoe shosse, 28, kv. 57, Tbilisi; Ivan I. Navdarashvili, Tmogvsky tupik, 14, Tbilisi; Guram G. Shvangiradze, Rustavskoe shosse, 34, Tbilisi; Revaz A. Grigolishvili, Kakhetinskoe shosse, 19, kv. 11, Tbilisi; Zurab G. Tadumadze, Digomsky massiv, prospekt Druzhby, kvartal 11, korpus 6a, kv. 19, Tbilisi; Ramaz G. Kiknadze, Rustavskoe shosse, 269, korpus 10, kv. 12, Tbilisi, all of U.S.S.R.

[21] Appl. No.: 261,165

[22] Filed: Apr. 30, 1981

[51] Int. Cl.³ .................................... H02J 3/12

[52] U.S. Cl. .................................... 323/334; 323/301

[58] Field of Search ............... 323/206, 214, 215, 301, 323/305, 328, 329, 332, 334, 355, 357, 358, 359; 363/148, 149, 152, 153, 155, 156

[56] References Cited

U.S. PATENT DOCUMENTS

| | | | |
|---|---|---|---|
| 2,767,371 | 10/1956 | Beaubien | 323/329 X |
| 3,184,675 | 5/1965 | Macklem | 323/334 |
| 3,188,552 | 6/1965 | Owen | 323/334 |
| 3,466,531 | 9/1969 | Chin | 323/334 |

FOREIGN PATENT DOCUMENTS

| | | | |
|---|---|---|---|
| 519693 | 7/1976 | U.S.S.R. | 323/210 |

*Primary Examiner*—William M. Shoop
*Attorney, Agent, or Firm*—Fleit, Jacobson & Cohn

[57] ABSTRACT

An adjustable current source comprises a choke (1) and a capacitor (2) whose reactive impedances are equal at the frequency of a variable voltage source (3), as well as a load current matching and adjusting unit made as a magnetic amplifier (4). Some outputs of the choke (1), the capacitor (2) and a primary winding (6, 7) of the magnetic amplifier (4) are coupled to respective phases of the variable voltage source (3). Other outputs of the choke (1), the capacitor (2) and the primary winding (6,7) of the magnetic amplifier (4) are joined in a star connection. The secondary winding (9, 10) of the magnetic amplifier (4) is coupled to the load (11). The control winding (13) of the magnetic amplifier (4) is coupled to a constant voltage source (14).

3 Claims, 2 Drawing Figures

ADJUSTABLE CURRENT SOURCE

The present invention relates to adjustable sources of current.

BACKGROUND ART

Known in the art is a controlled current source (cf., for example, USSR Inventor's Certificate No. 591,996 published in Discoveries, Inventions, Industrial Designs and Trade Marks Bulletin, No. 5, 1978) comprising a choke and a capacitor whose reactive impedances are equal at the frequency of a voltage source, some outputs thereof are connected to two respective phases of the voltage source. The controlled current source also comprises a load current matching and adjusting unit which is a transformer having magnetic shunts, one output of the primary winding thereof being coupled to a third respective phase of the current source. Other outputs of the capacitor, choke and the primary winding of the transformer are joined in a star connection. Secondary windings of the transformer are coupled to the load, whereas a bias winding of the magnetic shunt, which is the control winding, is coupled to the source of constant voltage.

In this controlled current source the load current does not depend upon the load resistance. The load current is controlled in accordance with a specific program through adjusting the bias winding current.

The above controlled current source features a rather complicated magnetic system of the transformer, which results in greater bulk and cost of the current source and presents quite a problem for manufacturers.

Besides, this complicated magnetic system tends to increase the expenditure of conductor materials, add to the power consumed for control and narrow the range of load current control according to a specific program.

DISCLOSURE OF THE INVENTION

The invention resides in providing an adjustable current source wherein a load current matching and adjusting unit simplifies the design of the source, widens the range of load current adjustment and decreases the load current control power.

This is achieved in that in an adjustable current source comprising a choke and a capacitor, whose reactive impedances are equal at the frequency of a variable voltage source, some outputs thereof being connected to two respective phases of a variable voltage source whose third phase is coupled to a load current matching and adjusting unit which is tied in a star connection with other outputs of the choke and the capacitor and coupled to the load, according to the invention, said load current matching and adjusting unit is a three-core magnetic amplifier whose primary winding is joined in a star connection and whose secondary winding is coupled to the load, the control winding being coupled to a source of constant voltage.

The adjustable current source should preferably have the control winding of the three-core magnetic amplifier located on the middle core, the primary winding should be made up of two components located on outer cores and coupled to each other so that electromotive forces induced in the control winding balance each other out, the secondary winding should also have two components arranged on outer cores of the three-piece core of the magnetic amplifier and coupled to each other so that electromotive forces induced therein by the primary winding are added together.

The secondary winding of the three-leg magnetic amplifier of the adjustable current source should advisably be arranged on the middle core thereof, the primary winding should be made up of two components arranged on outer cores and coupled to each other so that electromotive forces induced thereby in the secondary winding are added together, the control winding should also be made up of two components arranged on outer cores of the magnetic amplifier and coupled to each other so that electromotive forces induced therein by the primary winding are balanced out.

BRIEF DESCRIPTION OF THE DRAWINGS

The present invention will be now described in detail with reference to a specific embodiment thereof, taken in conjunction with the accompanying drawings, wherein.

BEST MODE FOR CARRYING OUT THE INVENTION

Figure 1:
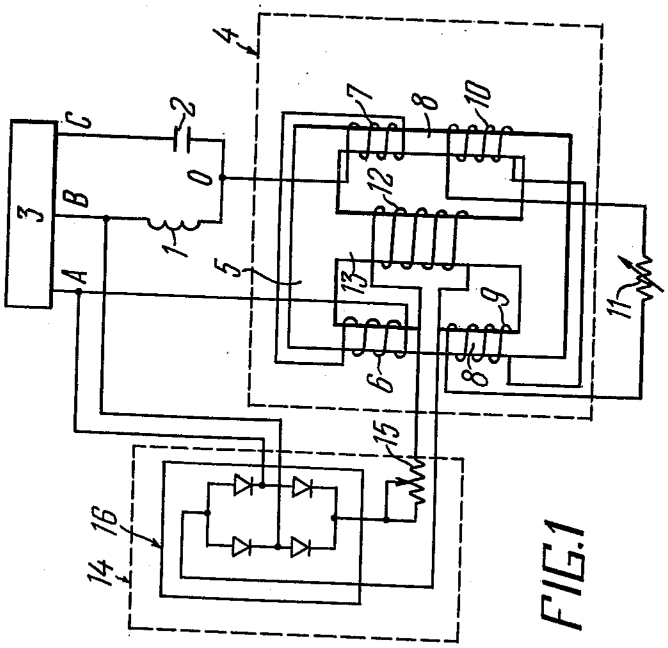
FIG. 1 shows a circuit diagram of an adjustable current source, according to the invention.

An adjustable current source comprises a choke 1 (FIG. 1) and a capacitor 2 whose reactive impedances are equal at the frequency of the voltage source 3. The adjustable current source also has a load current matching and adjusting unit made as a magnetic amplifier 4. The magnetic amplifier 4 features a three-leg core 5. Primary windings 6 and 7 of the magnetic amplifier 4 are arranged on outer core legs 8. First outputs of the primary winding 7, the capacitor 3 and the choke 2 form a star connection with a common tap 0. The first output of the primary winding 6, second outputs of the choke 1 and the capacitor 2 are coupled, respectively, to phases A, B and C of the variable voltage source 3. Secondary windings 9 and 10 are also arranged on the outer core legs 8. First outputs of the secondary windings 9 and 10 are coupled to a load 11.

The magnetic amplifier 4 also has a control winding 12 arranged on a middle leg 13 of the core 5 and connected to a constant voltage source 14 comprising an adjustable resistor 15 and a bridge rectifier 16, which are connected in series. The bridge rectifier 16 is coupled by the inputs thereof to the voltage source 3.

Figure 2:
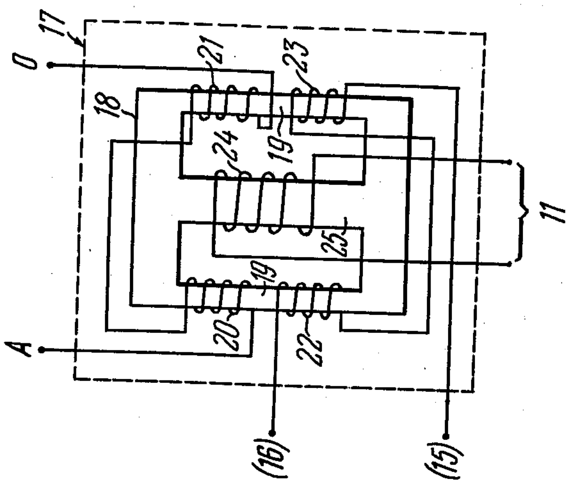
FIG. 2 shows a circuit diagram of another embodiment of a load current matching and adjusting unit of an adjustable current source, according to the invention.

Second outputs of the primary windings 6 and 7 are connected to each other in series. In this case electromotive forces induced thereby in the control winding 12 are balanced out. Second outputs of the secondary windings 9 and 10 are connected in series. Electromotive forces induced therein from the primary windings 6 and 7 are, consequently, added together. Referring to FIG. 2, another embodiment of the magnetic amplifier is possible for the sake of simplicity of the load current matching and adjusting unit in the adjustable current source. Here a magnetic amplifier 17 also features a three-leg core 18. Outer legs 19 carry primary windings 20 and 21 show first outputs are coupled to the capacitor 2, the chole 1, the variable voltage source 3 in the same manner as in FIG. 1. The outer legs 19 of the magnetic amplifier 17 carry control windings 22 and 23 whose first outputs are coupled to each other in series opposition. Electromotive forces induced in these windings 22 and 23 by the primary windings 20 and 21 balance each other out. Second outputs of the windings 22 and 23 are coupled to the constant voltage source 14. The secondary winding 24 is arranged on a middle leg 25 and is coupled to the load 11. Second outputs of the primary windings 20 and 21 are connected to each other in series aiding and electromotive forces induced thereby in the secondary windings 24 and 25 are consequently added together.

The adjustable current source operates as follows.

Three-phase voltage of the voltage source 3 is fed to the choke 1 (FIG. 1), the capacitor 2 and the magnetic amplifier 4. Current of the phase A does not depend upon the load 11 due to resonance and said current of the phase A remains unchanged, which can be accounted for in the following way. As the circuit of the load 11 is shorted the potential of the common tap 0 is equal to the potential of the phase A and the current of the branch of the load 11 is defined by the vector sum of currents of reactive elements, that is the choke 1 and the capacitor 2. The greater the resistance of the load 11, the closer is the state of resonance in the device, the higher is the voltage in the reactive elements and the potential of the common tap 0 with respect to the phase A. Higher voltage in the load 11 balances higher resistance of the load 11 and, consequently, the current in the load 11 remains unchanged. Shorting of the load 11 causes non increase of the current of the load 11 and is considered to be the normal operating condition of the current source.

The load 11 is supplied through the magnetic amplifier 4 whose primary windings 6 and 7 carry unchanged current. As this unchanged current passes through the primary windings 6 and 7, electromotive forces are induced in the secondary windings 9 and 10, which are added together and provide for unchanged current to pass through these windings and the load 11. As current goes through the primary windings 6 and 7, electromotive forces are also induced in the control winding 12. Magnetic fluxes produced by the primary windings 6 and 7 in the middle core leg 13 annihilate each other and electromotive forces induced in the control winding 12 balance out.

In order to adjust the current of the load 11 according to a specific program the variable resistor 15 of the constant voltage source 14 should be changed by changing the current in the control winding 12. The magnetic field in the legs 8 and 13 of the magnetic core of the magnetic amplifier 4 is saturated in this case. As permeability of the leg 13 of the magnetic core 5 changes, the transformation ratio between the primary windings 6,7 and the secondary windings 9, 10 also changes. Another level of current sets in the secondary windings 9,10 and in the load 11. This current level is assigned by the resistor 15 of the constant voltage source 14.

Thus, the current of the load 11 depends only on the control current prescribed by the resistor 15 of the voltage source 14 and does not depend on the resistance of the load 11.

In the magnetic amplifier 17 (FIG. 2) alternating magnetic fluxes produced by the primary windings 20 and 21 in the middle leg 25 of the magnetic core 17 are added together, whereas electromotive forces induced by the primary windings 20 and 21 in the control windings 22 and 23 arranged on the outer legs 19 are balanced out.

The adjustable current source featuring the magnetic amplifier 17 operates similar to the above described current source.

The use of the proposed adjustable current source permits two or threefold economy of materials (magnetic and conductor metals), less powerful control of the load current and wider range of load current adjustment. This makes manufacturing of the device much cheaper and operation much more efficient.

INDUSTRIAL APPLICABILITY

The proposed adjustable current source can be used in electrothermics, electric welding, plasma equipment and electric drives as a power source having properties of a current source.

We claim:

1. An adjustable current source comprising a choke and a capacitor whose reactive impedances are equal at the frequency of a variable voltage source, some outputs thereof being connected to two respective phases of the variable voltage source, the third phase thereof being connected to a load current matching and adjusting unit which is jointed to other outputs of the choke and the capacitor in a star connection and also coupled to the load, characterized in that the load current matching and adjusting unit is made as a three-leg magnetic amplifier (4) joined in a star connection by the primary winding thereof (6,7) and coupled to the load (11) by the secondary winding (9, 10) thereof, and also provided is a constant voltage source (14) coupled to a control winding (12).

2. An adjustable current source as claimed in claim 1, characterized in that the control winding (12) of the three-leg magnetic amplifier (4) is arranged on a middle leg (13), the primary winding is made up of two components (6 and 7) arranged on outer legs (8) and connected together so that electromotive forces induced thereby in the control winding (12) balance out, the secondary winding is also made up of two components (9 and 10) arranged on the outer legs (8) of the three-leg core (5) of the magnetic amplifier (4) and are joined so that electromotive forces induced therein by the primary winding are added together.

3. An adjustable current source as claimed in claim 1, characterized in that the secondary winding (24) of the three-leg magnetic amplifier (17) is arranged on the middle leg (25) thereof, the primary winding is made up of two components (20, 21) arranged on the outer legs (19) and connected to each other so that electromotive forces induced thereby in the secondary winding (24) are added together, the control winding is also composed of two components (22 and 23) arranged on the outer legs (19) of the magnetic amplifier (17) and connected to each other so that electromotive forces induced therein by the primary winding (20, 21) are balanced out.

* * * * *